US011981011B2

(12) United States Patent
Windsheimer et al.

(10) Patent No.: US 11,981,011 B2
(45) Date of Patent: May 14, 2024

(54) HAND-HELD POWER TOOL COMPRISING A CATCH MECHANISM

(71) Applicant: Robert Bosch GmbH, Stuttgart (DE)

(72) Inventors: Ralf Windsheimer, Stuttgart (DE); Suresh Subramaniam, Stuttgart-Weilimdorf (DE); Thomas Hampel, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/911,896

(22) PCT Filed: Mar. 22, 2021

(86) PCT No.: PCT/EP2021/057210
§ 371 (c)(1),
(2) Date: Sep. 15, 2022

(87) PCT Pub. No.: WO2021/191124
PCT Pub. Date: Sep. 30, 2021

(65) Prior Publication Data

US 2023/0130793 A1 Apr. 27, 2023

(30) Foreign Application Priority Data

Mar. 25, 2020 (DE) ..................... 10 2020 203 832.5

(51) Int. Cl.
*B25D 11/10* (2006.01)

(52) U.S. Cl.
CPC ...... *B25D 11/102* (2013.01); *B25D 2250/345* (2013.01)

(58) Field of Classification Search
CPC ............ B25D 11/102; B25D 2250/345; B25D 16/006; B25D 16/003
(Continued)

(56) References Cited

U.S. PATENT DOCUMENTS

| | | | | |
|---|---|---|---|---|
| 6,688,406 B1 | 2/2004 | Wu et al. | | |
| 2008/0283260 A1* | 11/2008 | Kramer | .................. | B25D 17/26 173/128 |

(Continued)

FOREIGN PATENT DOCUMENTS

| | | |
|---|---|---|
| CN | 207026543 U | 2/2018 |
| DE | 1 427 729 A1 | 1/1969 |

(Continued)

OTHER PUBLICATIONS

International Search Report corresponding to PCT Application No. PCT/EP2021/057210, dated Jul. 5, 2021 (German and English language document) (5 pages).

*Primary Examiner* — Daniel Jeremy Leeds
*Assistant Examiner* — Luis G Del Valle
(74) *Attorney, Agent, or Firm* — Maginot, Moore & Beck LLP

(57) ABSTRACT

A hand-held power tool, in particular an impact drill, is disclosed. The hand-held power tool includes a housing in which a drive unit for driving an output spindle is arranged. A catch mechanism is associated with the drive unit. The catch mechanism has a first crown disk which is connected to the output spindle for conjoint rotation, and a second crown disk which is arranged in the housing for conjoint rotation. In a first position, the first and second crown disks contact each other via associated catch geometries. In a second position, the second crown disk is arranged spaced apart from the first crown disk along a rotation axis of the output spindle. An annular friction element is arranged without friction in the first position, and generates a specified frictional force between the first and second crown disk in the second position.

12 Claims, 4 Drawing Sheets

(58) Field of Classification Search
USPC .......................................................... 173/217
See application file for complete search history.

(56) References Cited

U.S. PATENT DOCUMENTS

| | | | | |
|---|---|---|---|---|
| 2012/0111594 | A1* | 5/2012 | Herr .................... | B23B 31/1207 173/104 |
| 2019/0299383 | A1* | 10/2019 | Dedrickson .......... | B25D 11/106 |

FOREIGN PATENT DOCUMENTS

| | | | |
|---|---|---|---|
| DE | 200 07 588 | U1 | 8/2000 |
| DE | 10 2009 054 932 | A1 | 12/2010 |

* cited by examiner

HAND-HELD POWER TOOL COMPRISING A CATCH MECHANISM

This application is a 35 U.S.C. § 371 National Stage Application of PCT/EP2021/057210, filed on Mar. 22, 2021, which claims the benefit of priority to Serial No. DE 10 2020 203 832.5, filed on Mar. 25, 2020 in Germany, the disclosures of which are incorporated herein by reference in their entirety.

BACKGROUND

The present disclosure relates to a hand-held power tool, in particular an impact drill, having a housing in which a drive unit for driving an output spindle is arranged, wherein the drive unit is assigned a catch mechanism that has a first crown disk, which is connected to the output spindle for conjoint rotation, and a second crown disk, which is arranged in the housing for conjoint rotation, and wherein, in a first position, the first and second crown disks bear against one another via associated latching geometries and, in a second position, the second crown disk is arranged so as to be spaced apart from the first crown disk along an axis of rotation of the output spindle.

A hand-held power tool of this kind, in the form of an impact drill, is known from the prior art. The hand-held power tool has a drive unit with a catch mechanism. The catch mechanism has a first and a second crown disk, wherein the first crown disk is arranged for conjoint rotation with an output spindle of the drive unit and wherein the second crown disk is arranged for conjoint rotation in the housing of the hand-held power tool. During drilling operation, or with the catch mechanism activated, the two crown disks bear briefly against one another, and with the catch mechanism deactivated, they are arranged so as to be spaced apart from one another along an axis of rotation of the output spindle.

SUMMARY

The disclosure relates to a hand-held power tool, in particular an impact drill, having a housing in which a drive unit for driving an output spindle is arranged, wherein the drive unit is assigned a catch mechanism that has a first crown disk, which is connected to the output spindle for conjoint rotation, and a second crown disk, which is arranged in the housing for conjoint rotation, and wherein, in a first position, the first and second crown disks bear against one another via associated latching geometries and, in a second position, the second crown disk is arranged so as to be spaced apart from the first crown disk along an axis of rotation of the output spindle. An annular friction element is provided, which is arranged without friction in the first position and generates a predefined frictional force between the first and second crown disks in the second position.

The disclosure therefore allows the provision of a hand-held power tool having a catch mechanism, in which a frictional force is generated safely and reliably by the friction element only in the second position. As a result, the lifetime of the friction element can be significantly increased.

Preferably, the first crown disk has, on its end facing the drive unit, an outer circumferential groove for the arrangement of the annular friction element.

In this way, a suitable arrangement of the friction element can be made possible in a simple manner.

According to a further embodiment, the second crown disk has, on its inner circumference, a circumferential groove for the arrangement of the annular friction element.

In this way, an alternative suitable arrangement of the friction element can be made possible easily and in an uncomplicated manner.

Preferably, the first crown disk has, on its outer circumference, a circumferential collar formed perpendicularly to the axis of rotation of the output spindle, wherein, in the second position, the annular friction element bears against the circumferential collar.

In this way, an increase in the frictional force generated by the friction element in the second position can be achieved safely and reliably.

According to a further embodiment, the output spindle has, on its outer circumference, a circumferential groove for receiving the annular friction element.

In this way, a further suitable arrangement of the friction element can be made possible in a simple manner.

Preferably, the annular friction element is an O-ring.

In this way, a robust and stable friction element can be provided.

The annular friction element preferably exhibits rubber and/or felt.

In this way, an uncomplicated and cost-effective friction element can be provided.

Preferably, the drive unit has a spindle lock device, wherein the annular friction element prevents the spindle lock device from being released in the second position.

In this way, safe and reliable operation of the spindle lock device can be made possible, since undesired activation of the spindle lock device can be avoided by way of the friction element.

The first and second crown disks are preferably arranged in the second position during drilling and/or screwing operation of the hand-held power tool.

In this way, the frictional force can be generated easily and in an uncomplicated manner by the friction element during drilling and/or screwing operation.

According to one embodiment, the drive unit has a planetary transmission.

In this way, a suitable transmission can be provided in a simple manner.

BRIEF DESCRIPTION OF THE DRAWINGS

The disclosure is explained in more detail in the following description on the basis of exemplary embodiments illustrated in the drawings, in which.

DETAILED DESCRIPTION

In the figures, elements with the same or a comparable function are provided with identical reference signs and are described in detail only once.

Figure 1:
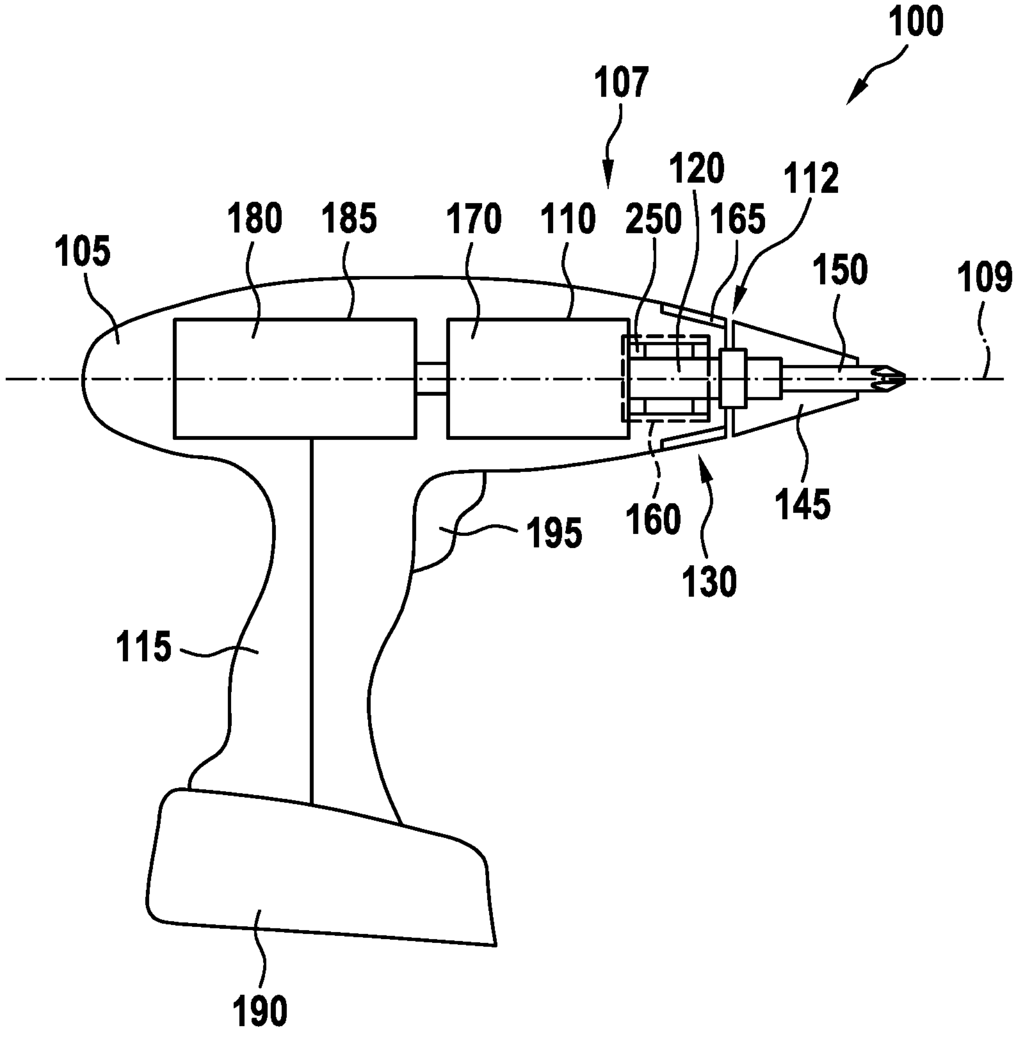
FIG. 1 shows a schematic plan view of an example of a hand-held power tool having a drive unit.

FIG. 1 shows an example of a hand-held power tool 100, which preferably has a housing, or tool housing, 105 with a handle 115. According to one embodiment, in order to be supplied with power independently of the grid, the hand-held power tool 100 is mechanically and electrically connectable to a rechargeable battery pack 190.

The hand-held power tool 100 has a drive unit 107 for driving an output spindle 120, which rotates about an axis of rotation 109 during operation. In this case, the drive unit 107 is assigned at least one drive motor 180, and a catch mechanism 130. As illustrated, the hand-held power tool 100 has an optional torque clutch 160, but can also be configured without the torque clutch 160.

In FIG. 1, the hand-held power tool 100 is in the form for example of a cordless impact drill. It should be noted, however, that the present disclosure is not limited to cordless impact drivers, but rather can be used in different hand-held power tools that have the catch mechanism 130, regardless of whether the hand-held power tool is operable electrically, i.e. independently of the grid with a rechargeable battery pack 190 or using grid power, and/or non-electrically.

The drive unit 107 is preferably arranged in the housing 105. According to one embodiment, the drive unit 107 is assigned a transmission 170, which is preferably in the form of a planetary transmission. Preferably, the transmission 170 is a planetary transmission that is formed with different gear or planetary stages and is driven in rotation by the drive motor 180 during operation of the hand-held power tool 100. In this case, for example the electric drive motor 180 supplied with power by the rechargeable battery pack 190, the transmission 170 and/or the catch mechanism 130 are arranged in the housing 105. The drive motor 180 is preferably connected to the output spindle 120 via the transmission 170. As illustrated, the drive motor 180 is arranged in a motor housing 185 and the transmission 170 is arranged in a transmission housing 110, wherein the transmission housing 110 and the motor housing 185 are arranged for example in the housing 105. Preferably, the transmission 170 is assigned the catch mechanism 130. In particular, the transmission 170 is assigned an impact function as a result.

The transmission 170 is preferably configured to transmit a torque generated by the drive motor 180 to the output spindle 120. The drive motor 180 is actuable, i.e. able to be switched on and off, for example via a manual switch 195 and can be any desired motor type, for example an electronically commutated motor or a DC motor. Preferably, the drive motor 180 is electronically controllable by open-loop or closed-loop control such that both reversing operation and operation with specifications relating to a desired rotational speed are able to be realized. The manner of functioning and the structure of a suitable drive motor are well known from the prior art and so a detailed explanation will not be provided here in order to keep the description concise.

The output spindle 120 is preferably mounted rotatably in the housing 105 via a bearing arrangement and is connected to a tool receptacle 145, which is arranged in the region of an end face 112 of the housing 105 and is designed for example in the manner of a chuck. The tool receptacle 145 serves to receive an application tool 150 and can be formed on the output spindle 120 or connected to the latter in the form of an attachment.

As illustrated, the output spindle 120 is assigned a spindle lock device 250. The latter is arranged for example in the axial direction of the output spindle 120 or along the axis of rotation 109 of the output spindle 120 between the transmission 170 and the tool receptacle 145 and serves to fix the output spindle 120 with the drive motor 180 switched off. The functioning of spindle lock devices is well known from the prior art and so a detailed explanation of the functioning of the spindle lock device 250 will not be provided here in order to keep the description concise.

Figure 2:
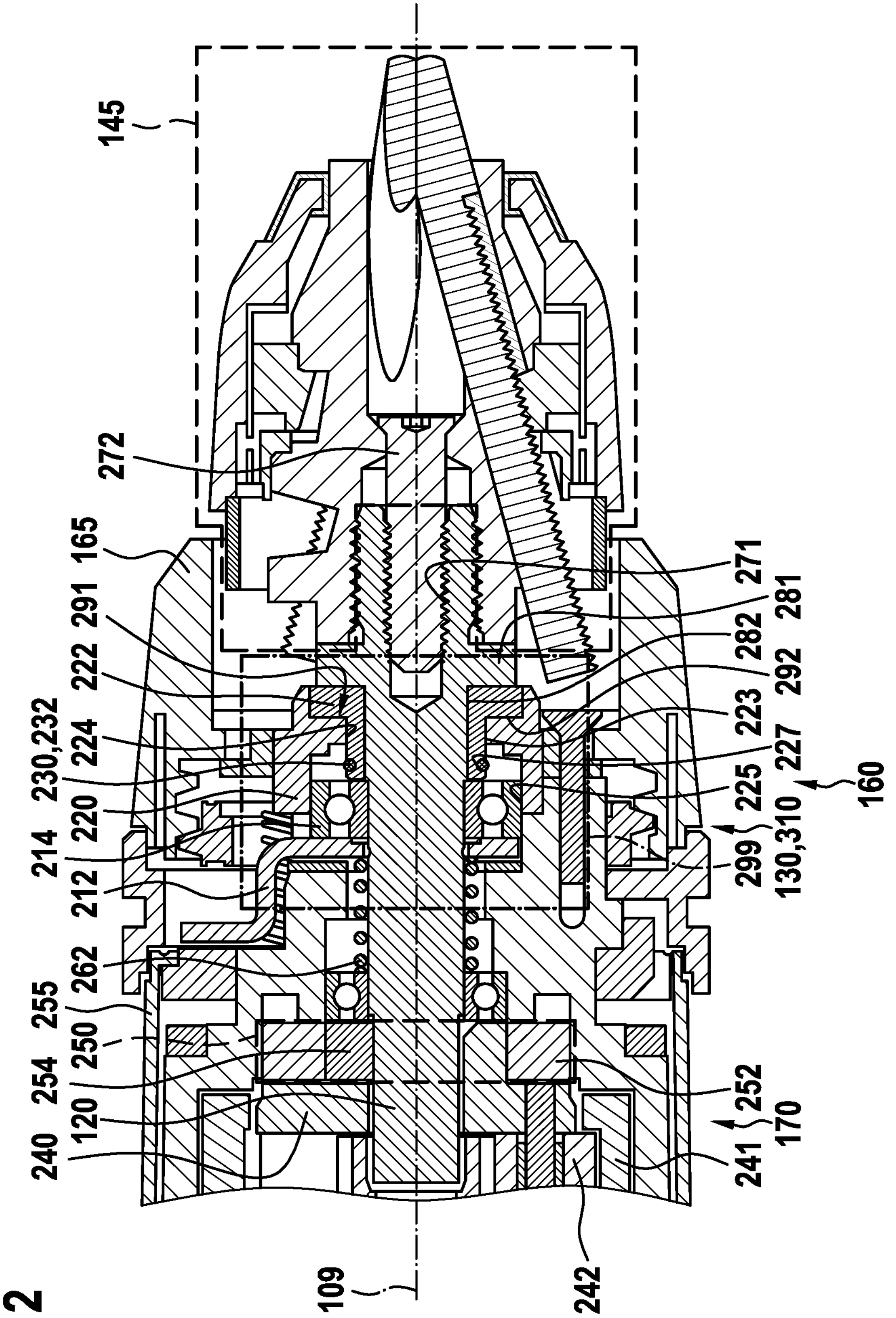
FIG. 2 shows a longitudinal section through the drive unit in FIG. 1 with a catch mechanism and a friction element.

FIG. 2 shows the transmission 170, the spindle lock device 250, the catch mechanism 130, and the tool receptacle 145 from FIG. 1. The transmission 170, which is in the form for example of a planetary transmission, has preferably at least one ring gear 241 and a planet carrier 240 with planets 242. Such a planetary transmission is well known from the prior art, for which reason a detailed explanation of the functioning of the planetary transmission 170 will not be provided here in order to keep the description concise.

As illustrated, the spindle lock device 250 has a clamping ring 252, which is mounted on the output spindle 120, or on a portion of the planet carrier 240, with predefined radial play, and on which at least one spindle roller 254 is arranged. It should be noted that a spindle lock device suitable for realizing the spindle lock device 250 and the functioning thereof are likewise well known to a person skilled in the art from the prior art and so a detailed explanation thereof will not be provided here in order to keep the description concise.

Furthermore, the output spindle 120 connected to the tool receptacle 145 has, as illustrated, on its end remote from the drive motor 180 in FIG. 1, an internal thread 271. As already described with reference to FIG. 1, the tool receptacle 145 is, as illustrated, configured in the form of a chuck. Therefore, the tool receptacle 145 is also referred to as "chuck 145" in the following text for the sake of simplicity. Preferably, the chuck 145 is fastened to an external thread of the output spindle 120 and preferably secured to the internal thread 271 by a screw 272.

Between the tool receptacle 145 and the catch mechanism 130, the output spindle 120 has, as illustrated, a collar 281. The catch mechanism 130 preferably has a first and second crown disk 222, 220. The first crown disk 222 is preferably connected to the output spindle 120 for conjoint rotation. In this case, the first crown disk 222 is arranged preferably so as to bear against the collar 281 in a region facing away from the chuck 145. Furthermore, the second crown disk 220 is preferably arranged in the housing 105 for conjoint rotation.

The first crown disk 222 preferably has a portion, mounted on the output spindle 120, with an outer circumference 223. Furthermore, the second crown disk 220 preferably has an inner circumference 224 on its portion facing the outer circumference 223 of the first crown disk 222. Preferably, the outer circumference 223 and the inner circumference 224 are configured such that the first crown disk 222 is movable, in particular axially displaceable, relative to the second crown disk 220.

Preferably, the first crown disk 222 is assigned a latching geometry 292 and the second crown disk 220 is assigned a latching geometry 291. In the position shown in FIG. 2, or a first position 310, the first and second crown disks 222, 220 bear against one another via the associated latching geometries 291, 292. In a second position (410 in FIG. 4), the second crown disk 220 is arranged so as to be spaced apart from the first crown disk 222 along the axis of rotation 109 of the output spindle 120.

Figure 4:
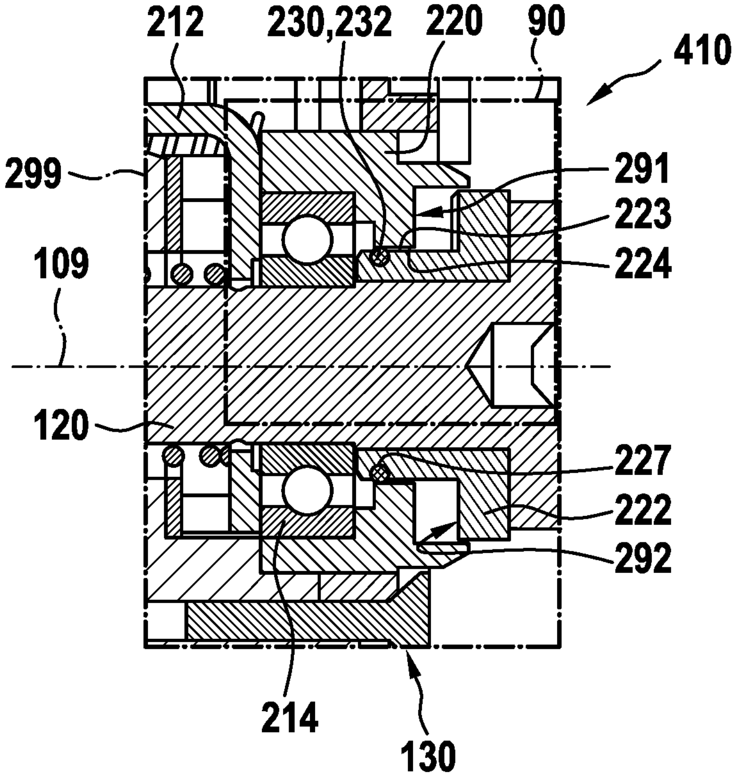
FIG. 4 shows a plan view of the enlarged region in FIG. 3 with an arrangement of the friction element in an active second position.

Preferably, an annular friction element 230 is provided, which is arranged without friction in the first position 310 and generates a predefined frictional force between the first and second crown disks 222, 220 in the second position (410 in FIG. 4). According to one embodiment, the first crown disk 222 has, on its end facing the drive unit 107, an outer circumferential groove 227 for the arrangement of the annular friction element 230. Preferably, the circumferential groove 227 is formed on the outer circumference 223 of the first crown disk 222. Preferably, the annular friction element 230 is an O-ring 232. Preferably, the annular friction element 230 exhibits rubber and/or felt.

The first and second crown disks 222, 220 are preferably arranged in the second position (410 in FIG. 4) during drilling and/or screwing operation of the hand-held power tool 100. In order to switch between an associated drilling and screwing mode and an impact mode, the hand-held power tool 100 has, as illustrated, a mode selection switch 255.

Preferably, the annular friction element 230 is configured to prevent the spindle lock device 250 from being released in the second position (410 in FIG. 4). In particular, undesired releasing of the spindle lock device 250 is prevented in the second position (410 in FIG. 4) or in drilling and/or screwing operation. The spindle lock device 250 is configured to act in the case of a lag of the output spindle 120 that is greater than a lag of the planet carrier 240. In this case, the spindle lock device 250 brakes the output spindle 120 until the speed of the output spindle 120 is lower than a speed of the planet carrier 240.

In the position shown in FIG. 2, or the first position 310, the transmission 170 is in an impact mode. In this case, the output spindle 120 has passed into the transmission and the crown disks 220, 222 run on one another. The annular friction element 230 is out of operation in this case.

In the impact mode, the mode selection switch 255 releases a bearing holder 212, with the result that the output spindle 120 is released or movable in an axial direction, or along the axis of rotation 109. Preferably, the output spindle 120 is assigned a bearing 214. Preferably, the bearing 214 is fixedly arranged on an outer circumference 282 of the output spindle 120 and preferably at least partially arranged in an inner receptacle 225 of the second crown disk 220.

In drilling and/or screwing operation, the bearing holder 212 is preferably pushed or urged by a compression spring 262—toward the right as illustrated in FIG. 2—into the second or right-hand position. Preferably, the bearing holder 212 is in the second or right-hand position when no external forces act on the output spindle 120. In this case, the bearing holder 212 acts on the bearing 214 and the output spindle 120. In the process, the axial movement, or a movement of the output spindle 120 along the axis of rotation 109, is blocked. In this case, the annular friction element 230 is arranged between the crown disks 220, 222 and brings about a frictional force on the output spindle 120.

This effect can also occur in the impact mode when no external force acts on the chuck 145. In this case, a compression spring 262 urges the bearing holder 212, the output spindle 120 with the bearing 214, the first crown disk 222, and the friction element 230 to the right as illustrated in FIG. 2. By being acted on by means of external forces acting in an axial direction, the bearing holder 212 is urged as illustrated to the left, or into the first position. Depending on the position of the mode selection switch 255, the insertion movement is blocked in drilling and screwing operation or enabled in impact drilling operation.

Furthermore, in FIG. 2, the catch mechanism 130 is arranged with the first and second crown disks 222, 220 in a region 299. The region 299 is illustrated in an enlarged manner in the following figures.

Figure 3:
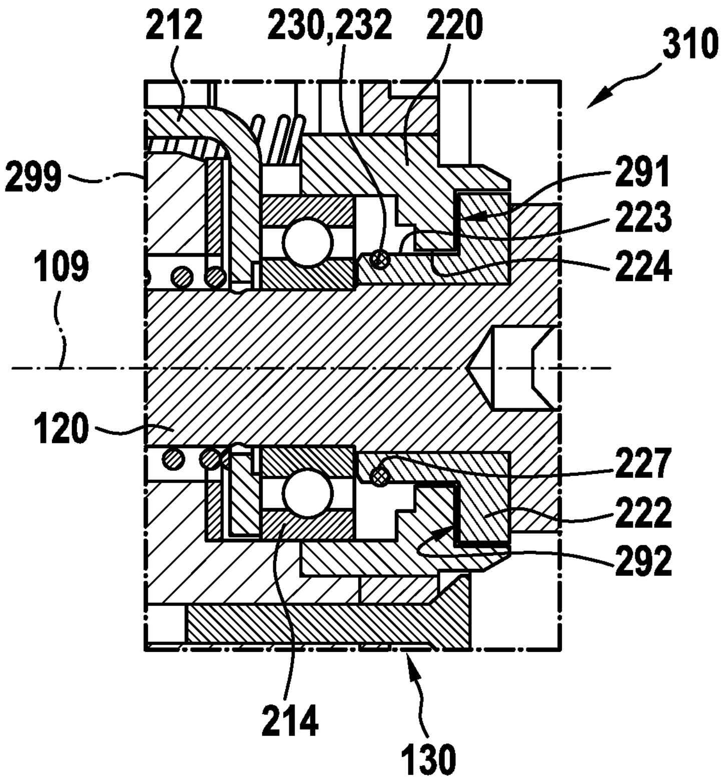
FIG. 3 shows a plan view of an enlarged region of FIG. 2 with an arrangement of the friction element in a passive first position.

FIG. 3 shows the region 299 from FIG. 2 and illustrates the catch mechanism 130 in the first position 130. In the first position 310, the first and second crown disks 222, 220 preferably bear on another via their latching geometries 292, 291. Furthermore, the annular friction element 230 is arranged in the first position 310 preferably without friction, i.e. the annular friction element 230 does not exert any frictional force on the output spindle 120.

FIG. 4 shows the region 299 from FIG. 2 and FIG. 3 and illustrates the catch mechanism 130 in a second position 410. In the second position 410, the second crown disk 220 is preferably arranged so as to be spaced apart from the first crown disk 222, preferably along the axis of rotation 109 of the output spindle 120. In particular, the latching geometries 291, 292 are arranged so as to be spaced apart from one another in the second position 410.

According to one embodiment, the inner circumference 224 of the second crown disk 220 is in this case arranged in the region of the annular friction element 230, wherein a predefined frictional force is generated between the first and second crown disks 222, 220. Furthermore, FIG. 4 illustrates a region 490 indicated, as illustrated, above the axis of rotation 109.

Figure 5:
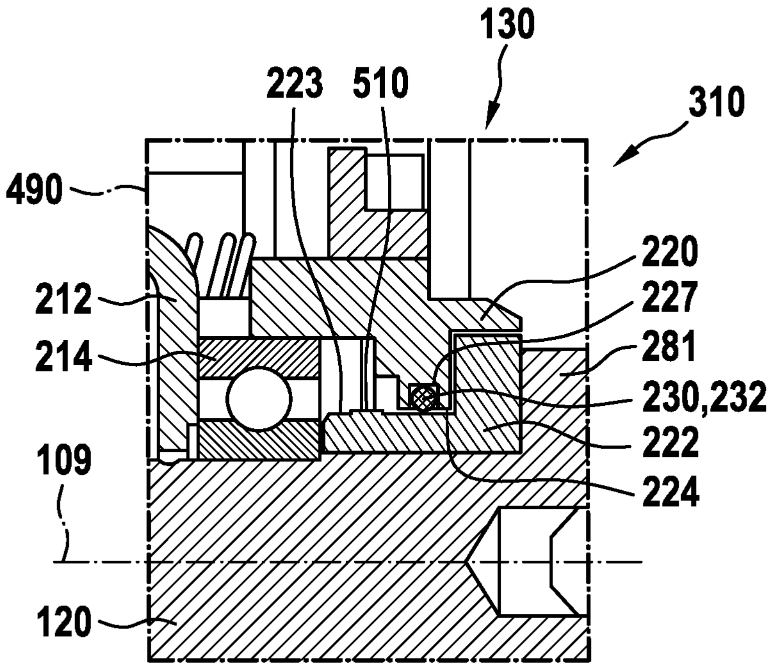
FIG. 5 shows a plan view of an enlarged region of FIG. 4 with an alternative arrangement of the friction element, wherein the friction element is arranged in a passive first position.

FIG. 5 shows the region 490 from FIG. 4 with the catch mechanism 130 in the first position 310. In this case, the annular friction element 230 is arranged, according to a further embodiment, on the inner circumference 224 of the second crown disk 220. For this purpose, the second crown disk 220 preferably has, on its inner circumference 224, the circumferential groove 227 for the arrangement of the annular friction element 230.

Alternatively, the first crown disk 222 has, on its outer circumference 223, a circumferential collar 510 formed perpendicularly to the axis of rotation 109 of the output spindle 120. In the second position 410 of FIG. 4, in which the annular friction element 230 is active, or develops a frictional force, the annular friction element 230 preferably bears against the circumferential collar 510.

Figure 6:
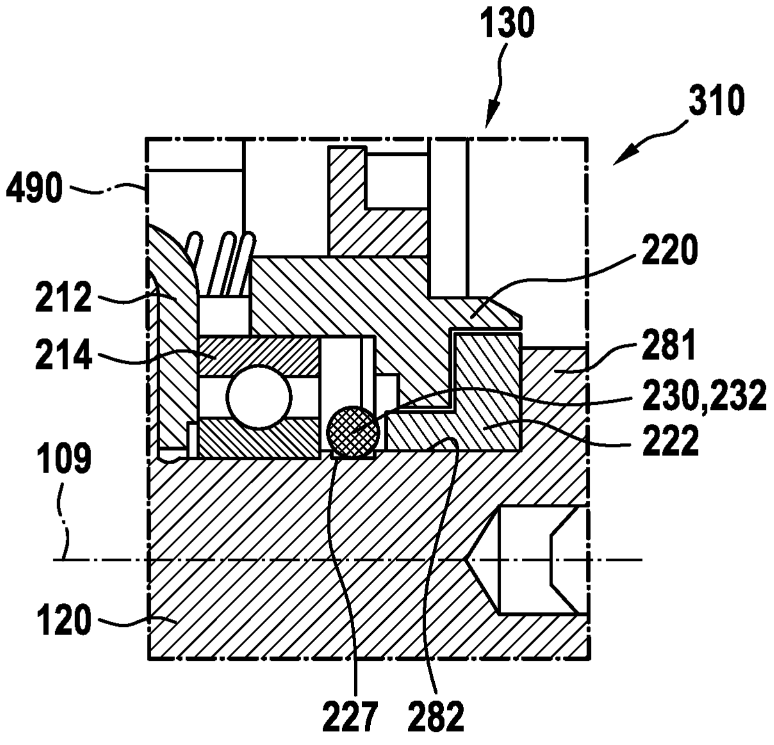
FIG. 6 shows a plan view of an enlarged region of FIG. 4 with a further alternative arrangement of the friction element, wherein the friction element is arranged in a passive first position.

FIG. 6 shows the region 490 from FIG. 4 with the catch mechanism 130, wherein the annular friction element 230 is arranged, according to a further embodiment, on the outer circumference 282 of the output spindle 120. For this purpose, the output spindle 120 preferably has, on its outer circumference 282, the circumferential groove 227 for receiving the annular friction element 230.

Compared with the embodiments in FIG. 2 to FIG. 5, the first crown disk 222, according to the embodiment shown in FIG. 6, is shorter along the axis of rotation 109. In this case, the circumferential groove 227 is preferably arranged in the region of the bearing 214. Furthermore, the annular friction element 230 has a larger diameter compared with the embodiments in FIG. 2 to FIG. 5. Alternatively, the output spindle 120 could also have the circumferential collar 510 from FIG. 5, in order to make it possible to use the annular friction element 230 according to FIG. 2 to FIG. 5.

It is noted that the above-described different embodiments are also combinable with one another. Thus, a catch mechanism 130 can have an annular friction element 230 according to the embodiment in FIG. 2 to FIG. 4 and a further friction element 230 according to the embodiment in FIG. 5.

Furthermore, a catch mechanism 130 can also have a plurality of annular friction elements 230 arranged next to one another, for example along the axis of rotation 109. As a result of the configuration of the annular friction elements 230 and the arrangement thereof, a desired frictional force can be set.

The invention claimed is:

1. A hand-held power tool, comprising:

a housing;

an output spindle;

a drive unit configured to drive the output spindle, the drive unit being arranged in the housing; and an annular friction element arranged in the housing, wherein the drive unit includes a catch mechanism that has a first crown disk connected to the output spindle for conjoint rotation, and a second crown disk arranged in the housing for conjoint rotation, wherein, in a first position, the first crown disk and the second crown disk bear against one another, wherein, in a second position, the second crown disk is arranged so as to be spaced apart from the first crown disk along an axis of rotation of the output spindle, and wherein the annular friction element is arranged without friction in the first position and generates a predefined frictional force between the first crown disk and the second crown disk in the second position.

2. The hand-held power tool as claimed in claim 1, wherein the first crown disk has, on its end facing the drive unit, an outer circumferential groove configured to receive the annular friction element.

3. The hand-held power tool as claimed in claim 1, wherein the second crown disk has, on its inner circumference, a circumferential groove configured to receive the annular friction element.

4. The hand-held power tool as claimed in claim 3, wherein:

the first crown disk has, on its outer circumference, a circumferential collar formed perpendicularly to the axis of rotation of the output spindle, and in the second position, the annular friction element bears against the circumferential collar.

5. The hand-held power tool as claimed in claim 1, wherein the output spindle has, on its outer circumference, a circumferential groove configured to receive the annular friction element.

6. The hand-held power tool as claimed in claim 1, wherein the annular friction element is an O-ring.

7. The hand-held power tool as claimed in claim 1, wherein the annular friction element includes rubber and/or felt.

8. The hand-held power tool as claimed in claim 1, wherein:

the drive unit has a spindle lock device, and the annular friction element is configured to prevent the spindle lock device from being released in the second position.

9. The hand-held power tool as claimed in claim 1, wherein the first crown disk and the second crown disk are located in the second position during a drilling and/or screwing operation of the hand-held power tool.

10. The hand-held power tool as claimed in claim 1, wherein the drive unit has a planetary transmission.

11. The hand-held power tool as claimed in claim 1, wherein the hand-held power tool is an impact drill.

12. The hand-held power tool as claimed in claim 1, wherein the first crown disk and the second crown disk each have associated latching geometries that bear against one another in the first position.

* * * * *